Patented Oct. 9, 1928.

1,687,307

UNITED STATES PATENT OFFICE.

RENE OPPENHEIM, OF LEVALLOIS-PERRET, FRANCE, ASSIGNOR TO SOCIÉTÉ ANONYME LE CARBONE, OF LEVALLOIS-PERRET, FRANCE.

BATTERY, ELECTRIC ACCUMULATOR, AND ELECTROLYZING APPARATUS.

No Drawing. Application filed September 30, 1925, Serial No. 59,729, and in France December 10, 1924.

In certain types of batteries, electric accumulators and electrolyzing apparatus, electrodes are employed composed of porous plates or of powders comprising porous grains, with the object of maintaining in these plates, grains or porous powder their power of absorption of gases throughout the whole life of such apparatus. Applicant has described in prior specifications, methods for producing impermeability of these plates or grains, in such a manner that the electrolytic liquid cannot penetrate the pores of the plate or the grains of powder, and these preserve their property or absorption of gases in a lasting manner.

The present invention has for its objects the utilization, as an absorbing and catalyzing material in these devices, of substances having the property of being practically impermeable to liquids, without necessitating any special treatment, while possessing a large power of absorption of gases; the invention consists particularly in the utilization of dehydrated colloidal gels preferably the stable higher polymers thereof.

In primary batteries this absorbing substance need only be stable in one direction of flow of ions; in electric accumulators and electrolyzing apparatus on the contrary it is indispensable that this substance should be stable in the two directions of flow of ions.

The absorbing substances employed must not be attacked by the liquid in which they are immersed.

The invention is particularly characterized by the utilization of gel of silica or dehydrated aluminium gel as absorbing and catalyzing material in the types of batteries and electric accumulators and electrolyzing apparatus above defined.

The gel of silica used according to the present invention is obtained by the ordinary process consisting in:—reacting upon a silicate with hydrochloric acid, silicate of soda for example, in a manner to obtain the hydrated colloidal silica—submitting the latter to several successive washing operations to free it from products such as chlorine, acid etc.—which it may contain—then drying it progressively at first in free air and then by progressively heating up to about 500° C. After this desiccation, the silica is in a horny state and is susceptible to being easily reduced to powder.

The product thus obtained, called gel of silica possesses the property of being very stable, that is to say of preserving an invariable constitution when put in the presence of a liquid or when it is submitted to the action of heat.

By way of example there will be hereinbelow described one manner of application of this gel of silica in the case of its utilization in a lead accumulator.

1 kg of lead powder or an oxide of lead is well mixed with 200 grams of powdered gel of silica and this mixture is then moistened with 100 cubic cms of water or preferably acidulated water with 10% sulphuric acid.

The paste thus obtained is compressed into the form of a plate, or is utilized in the manner ordinarily employed for the active material of accumulator plates, that is to say crammed in a conducting support formed by a grid of lead, carbon, etc.

Instead of gel of silica one may equally well employ dehydrated aluminium gel obtained in the ordinary manner by parting with aluminium sulphate for example.

The present invention permits of attaining directly without any special preparation accumulator plates in which the active material is divided by a substance of low density, possessing a large power of absorption of gases, and offers particularly as advantages, a better utilization of the active material and a considerable augmentation in capacity.

The gel of silica, or dehydrated aluminium gel may be mixed with another body possessing the property of absorbing gases and, of course, impermeable to liquid or rendered impermeable to the latter by suitable treatment.

In the case where it is desired that the gel of silica or the aluminum gel should be completely impermeable to liquids this result may be obtained by rendering the beads of gel of silica or of aluminium impermeable by any suitable process, for example, by exposing the powdered gel to hydrocarbon vapours or paraffin vapour, or again by mixing it with a solution of rubber containing about 10 kgs of rubber to 100 litres of light petrol, and subsequently evaporating the petrol. In this latter case the rubber thus incorporated in the mass offers in addition the advantage of imparting to the active material a certain elasticity such that during the functioning of the accumulator, the plates have a less tendency under certain conditions to disintegrate by expansion, while on the other hand, the rubber also acts as an absorbing body for gases.

Claims:—

1. An electrode for batteries, electric accumulators and electrolytic apparatus comprising a mixture of a granular active material and a granular material permeable to gases and substantially impermeable to liquids.

2. An electrode for batteries, electric accumulators and electrolytic apparatus comprising a mixture of a granular active material and a granular dehydrated colloidal gel.

3. An electrode for batteries, electric accumulators and electrolytic apparatus comprising a mixture of a granular active material and a granular dehydrated colloidal gel having a high degree of stable polymerization.

4. An electrode as recited in claim 2 wherein the dehydrated colloidal gel has been rendered completely impermeable to liquids by coating the grains thereof with a suitable electrolyte-resisting compound.

5. An electrode for batteries, electric accumulators and electrolytic apparatus comprising a mixture of a granular active material and granular gel of silica.

6. A process of manufacturing an electrode for batteries, electric accumulators and electrolytic apparatus comprising mixing an active material with a dehydrated colloidal gel, moistening the mixture with water, and compressing the paste thus obtained in the form of a plate.

7. A process of manufacturing an electrode for batteries, electric accumulators and electrolytic apparatus comprising mixing a dehydrated colloidal gel with a solution of rubber, evaporating the solvent of the rubber, mixing the resultant mixture with the active material for the electrode, and compressing the compound thus obtained in the form of a plate.

8. A process of manufacturing an electrode for batteries, electric accumulators and electrolytic apparatus comprising mixing gel of silica with a solution of rubber, evaporating the solvent of the rubber, mixing the resultant mixture with the active lead compound for the electrode, and compressing the compound thus obtained in the form of a plate.

The foregoing specification of my "improvements in batteries, electric accumulators and electrolyzing apparatus" signed by me this eighteenth day of September, 1925.

RENÉ OPPENHEIM.